April 25, 1950 J. A. RANKIN ET AL 2,505,574

SIGNALING SYSTEM

Filed Aug. 2, 1943 2 Sheets-Sheet 1

INVENTORS
HARMON B. DEAL
JOHN A. RANKIN &
WILLIAM R. ALEXANDER
BY H. G. Grover
ATTORNEY

SIGNALING SYSTEM

Filed Aug. 2, 1943 2 Sheets-Sheet 2

INVENTORS
HARMON B. DEAL
JOHN A. RANKIN &
WILLIAM R. ALEXANDER
BY H. S. Grover
ATTORNEY Patented Apr. 25, 1950 2,505,574

UNITED STATES PATENT OFFICE 2,505,574

SIGNALING SYSTEM

John Argus Rankin, Chicago, Ill., William Rufus Alexander, Upper Montclair, N. J., and Harmon B. Deal, Bloomington, Ind., assignors to Radio Corporation of America, a corporation of Delaware Application August 2, 1943, Serial No. 497,000

12 Claims. (Cl. 332—22)

Figures 1, 2:
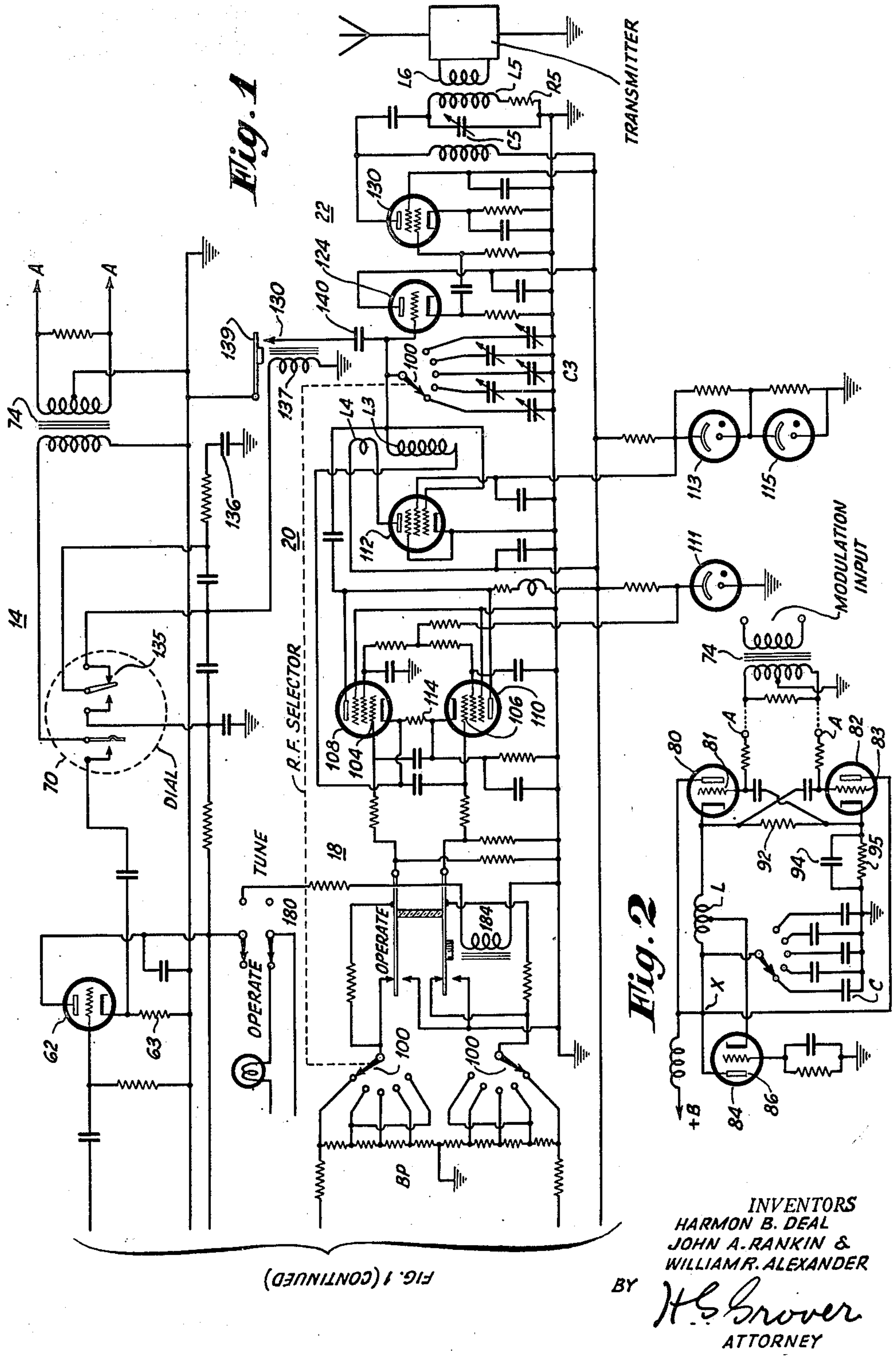
Figure 1:
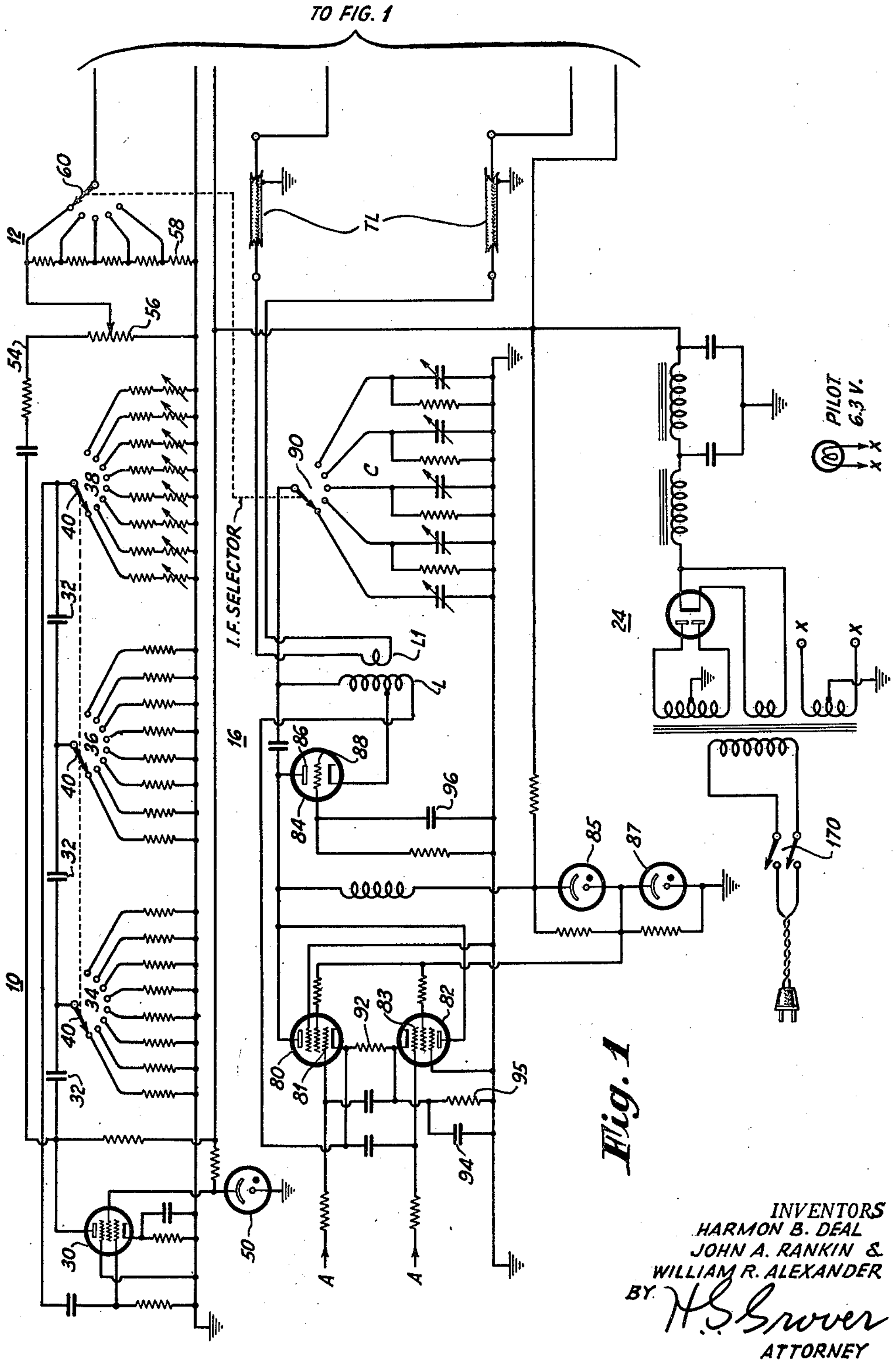

An object of this invention is the improved control from a remote point of a selected one of a large number of operations.

We attain this object by a new and improved method of and means for generating at the control point or points wave energy in which a plurality of series of distinct and separate incidents such as changes in timing are caused to occur. The frequency of the generated wave energy on which the series of incidents occur is changeable and thus a large number of incident combinations are available. The incident combinations may be used at a receiving point or points to perform a selected function, so that an operator at the transmitter by controlling the transmitted wave may select and control one of a large number of operations at a selected receiver of a large number of separated receivers or selected receivers of groups of receivers, or any selected one of a large number of receivers performing a single operation may be controlled.

In a particular application a selected subcarrier (referred to as the intermediate frequency at the receiver) of which there are five, is modulated by a selected frequency, of which there are eight, and used to modulate a selected carrier, of which there are five, to provide 200 different combinations. These transmitted combinations then cooperate with receiver relays wherein 10,000 different combinations are provided so that some two million combinations are possible with the elements provided. Thus, each of two million separate receivers could be operated separately on its own particular individual preset combination. If several receivers were preset to be operable on the same combination, then of course, several million receivers could be remotely operated.

The general idea is that a few or a few hundred receivers equipped with detonating mechanisms may be remotely fired separately or in groups (depending on the coding of the firing combination).

The high order of numbers of combinations provided is to minimize the chance of inadvertent operation of a particular receiver from noise, interference or even operation of the transmitter to detonate mines in another area or category (for example, docks, airfields, power stations or barracks may be operated selectively). Thus, if millions of elements must enter into a proper combination to secure a detonation of a particular receiver or group of receivers, the chances of inadvertent or enemy operation become vanishingly small.

The receiver relays may each complete a circuit to control a desired operation. The number of tones, sub-carriers, carriers, and receiver relay combinations may be increased to expand the total number of combinations to a very large number.

In the particular application described, the receiver relays complete a squibb circuit to detonate land mines or similar exposive charges. Obviously, the means of our invention may be put to other purposes.

The wave energy modulated as described above, which is of constant amplitude, is then in the particular application used to excite a frequency modulated type radio transmitter.

The controlled receivers are to be located at or near a land mine and the relays therein complete circuits for detonating the associated land mine.

This system is quite flexible in that the number of combinations may be increased or decreased by minor changes in the receiver units.

An additional object is to provide a system, as disclosed briefly above, which is secret to a high degree. This is accomplished by using a frequency modulation of the sub-carrier by the tone and a frequency modulation of the carrier by the frequency modulated sub-carrier, and by providing receivers responsive only to such modulation. Moreover, since the tone selected is at the discretion of the transmitter operator as guided by selection (pre-knowledge) of the receiver to be the control medium, as is the subcarrier and carrier frequency selected, the possibility that an enemy transmitter will be operated even by chance in the proper manner to take control through a receiver is practically nil. Moreover, by providing receivers which function only on receipt of the particular type of modulation we transmit, there is still less chance that an enemy transmitter could operate through the receivers even by chance to explode a mine.

The receiver is free from radiation; spurious operation by either the enemy or static; and from blocking by the enemy.

Other objects to be attained and other advantages which flow from the attainment of such objects appear in the detailed description which follows.

In the present application we disclose and claim the transmitter.

In Seeley U. S. application No. 509,232, filed November 6, 1943, which ripened into Patent #2,428,297 on September 30, 1947, the system is disclosed, while in Deal, et al., U. S. application No. 514,964, filed December 20, 1943 which ripened on December 31, 1946 into Patent #2,413,296, the receiver is disclosed.

In describing our invention in detail reference will be made to the attached drawings, wherein Fig. 1 (sheets 1 and 2) illustrates one embodiment of our invention, while Fig. 2 illustrates in simplified form the phase shifting network used in the reactance tube modulators of the embodiment illustrated in Fig. 1.

In the figure the circuit designated 10 is a low frequency oscillation generator of the resistance capacity type arranged with switching means to generate oscillations at a plurality of different frequencies, in the arrangement developed, eight frequencies falling between 200 and 1200 cycles per second.

16 is an intermediate frequency oscillator the reactance of which is adjustable by a section of the I. F. selector switch referred to more in detail hereinafter to generate sub-carriers of a selected one of five different intermediate frequencies. 16 designates generally also the reactance tube modulator including differential reactance tubes controlled by the output of the transformer in the apparatus of 14.

12 is an attenuator network wherein is adjusted, by switching means, the amplitude of the generated tone oscillations necessary to modulate or sweep the intermediate frequency, generated at 16, through the desired range. Note that this attenuator switch is designated the I. F. selector and it comprises two ganged switch sections the other section of which is in the intermediate frequency oscillator 16. The ganged switch in 16 provides a means of selecting one of five available intermediate frequencies. The ganged companion switch in 12 provides a level or gain control means to provide the correct amplitude of audio frequency to properly drive the two I. F. modulator tubes.

14 represents a manual dial through which the output of 10 as regulated by 12 is fed to the transformer at 74 to supply the selected tone, dialed manually as desired, to 16.

18 designates generally a resistance network by means of which the input (which is the frequency modulated output of the I. F. generator) to the second reactance tube modulator associated with the carrier generator designated generally at 20 is adjusted. Note that this input intensity adjustment switch is ganged with the switch which selects the condenser to be included in the oscillation generator frequency controlling circuit of the apparatus in 20, so that for each carrier frequency a particular input intensity is used to provide an equal sweep of the carrier throughout the range of operation. The primary function of the gang switch in 18—20 is to provide frequency selection—the ganged attenuator 18 merely and incidentally insures proper operating levels of I. F. signal. 18 also designates generally a relay the contacts of which normally during operation are in the upper position but are moved to the lower position for tuning of the system.

22 designates generally the amplifier for increasing the carrier the desired amount, and this carrier as modulated is used to excite a conventional frequency multiplying transmitter.

24 is the power supply rectifier and transformer for the system.

It is believed that our improved control transmitter system as described briefly above will be readily understood by those skilled in the art. However, in order that the various novel and useful features thereof will be clearly recognized, a detailed description of the various elements will be given.

The tone generator tube 30 (Fig. 1, sheet 1) has its anode coupled to its control electrode by way of a phase shifting network comprising series condensers 32 and groups 34, 36 and 38 of shunting resistors. This tone oscillator is of the phase shift or R. C. type. Tuning is accomplished by changing the shunt resistance in each of the three sections 34, 36 and 38 of the phase shift network by adjustment of a ganged three deck rotary switch indicated at 40. Each of the groups of resistances includes eight different resistances, so that eight different audio frequencies are provided. To insure reasonable frequency stability a voltage regulator tube 50 is connected across the high potential source supplying the screening electrode of tube 30. By this means the required stability is obtained without additional circuit compensation.

The generated tone is supplied by line 54 to an intensity adjusting potentiometer 56 and then to a resistance network 58, points of which are connected by a switch 60 to the input electrode of a tube 62 operating as a cathode follower amplifier.

The tone voltage necessary to produce a specific sweep of the I. F. oscillator in 16 varies with changes in the frequency of operation of the oscillator. We change the intensity of the tone voltage fed from 74 to the input of the reactance tubes in 16 by means of the resistances 58 cooperating with one deck 60 of the I. F. selector switch.

The drop across the resistor 63 is supplied to the telephone dial 70 and through the dialing mechanism to the primary winding of a transformer 74. The dialing mechanism 70 is manually controlled and pulses the audio frequency at a repetition rate of approximately 10 pulses per second. This permits the transmission of from 1 to 10 pulses per dial operation, since the dial has ten positions.

The output of transformer 74, as controlled by the dial 70, is fed differentially to the control electrodes 81 and 83 of the push-pull reactance tubes 80 and 82 which as connected control the timing of the oscillatory energy generated in tube 84. The tube 84 has its anode 86 and grid 88 coupled in a Hartley oscillator of the grounded grid type. This oscillator is tuned by a selected one of five capacities C put in shunt to inductance L by the second section of the I. F. selector switch. The capacities C are shunted by loading resistances to maintain constant output over the tuning range. Frequency stability over the range is provided by using zero drift condensers C and two series voltage regulator tubes 85 and 87 in the direct current supply to the anodes of tubes 80, 82 and 84, and the screening electrodes of tubes 80 and 82. No other circuit compensation is needed. There are five capacities adapted to be switched into the circuit LC so that the intermediate frequency oscillator may operate at any one of five frequencies, depending upon the position of the section 90 of the I. F. selector switch.

The anode 86 of the oscillator 84 and one end of L are coupled to the anodes of the tubes 80 and 82 so that generated voltages of like phase appear on these anodes. The other end of the inductance L is connected through the cathode resistor 92 of tubes 80 and 82 and coupling condenser 94 to ground and thence to the lower terminal of the condenser C. The grid electrode 88 is coupled to ground by a bias resistance shunted by coupling condenser 96.

If we consider the tank circuit L, resistance 92 (the bias resistance 95 shunted by condenser 94 may be disregarded), ground, and C, we will see that if we assume the potential at the upper end of L and the anodes of tubes 80 and 82 is of a first phase, the phase of the potentials of the generated frequency at one end of the resistance 92 will be advanced 90° with respect to said first phase, while the phase of the generated voltage at the other end of the resistance 92 will be retarded 90° with respect to said first phase.

More exactly, we have a network, as illustrated in Fig. 2. In this network, both ends of the bias resistance 95 and condenser 94 may be considered at ground radio frequency potential. This is permissible because 94 is large enough to be considered a short circuit at the generated frequency. (In one embodiment 94 is 25 mfd. and bias resistance 95 is 390 ohms.) The generated voltage of said first phase at point X is applied to the anodes of both tubes 80 and 82. The alternating current path for tube 82 may be considered from point X through inductance L, the resistance 92 (in one embodiment 22 ohms), the cathode of tube 82, and back to X. The current through this network is reactive, so that there is a potential drop through 92 which is displaced about 90° at the cathode of 82. This voltage is also applied to the grid 81 of tube 80. The alternating current path for tube 80 may be considered from the point X through condenser C, the resistance 92, the cathode of tube 80, and back to point X. This current is also reactive, but the reactance is of opposite sign, so that the potential drop caused thereby in 92 is displaced in phase about 90° in the other direction at the cathode of tube 80. This voltage is also applied to the grid 83 of tube 82. Thus we have in both tubes 80 and 82 a phase quadrature relation between the anode and grid voltages. In one tube the grid voltage leads the anode voltage so that the current in the tube to the anode leads the anode voltage and the tube is in effect a capacity in the tank circuit. In the other tube the grid voltage lags the anode voltage so that the current in the tube lags the anode voltage and the tube is in effect an inductance in the tank circuit. The positions of the inductance L and condenser C may be interchanged, thus interchanging the effective reactances presented to the respective tubes in the tank circuit.

Differential modulation of the tubes by potentials from the transformer 74 then will reduce the capacitive reactance and the inductive reactance simultaneously and vice versa to change the frequency of the intermediate frequency oscillations generated.

The timing modulated intermediate frequency energy is fed from L to a low impedance inductance L1 and thence by lines TL to a balanced potentiometer voltage divider BP. Points on this potentiometer or voltage divider are associated with two sections of the three section R. F. selector switch 100 to apply the timing modulated intermediate frequency energy, in a balanced sense and of proper amplitude for constant deviation at the five different radio frequencies, to the controlling electrodes 104 and 106 of reactance tube modulators 108 and 110. These modulators are associated with a radio frequency oscillation generator including tube 112 having an inductance L3 in a grid circuit including the resistance 114 between the cathodes of the reactance tubes 108 and 110. The anode of the tube 112 is regeneratively coupled by an inductance L4 to the inductance L3 so that oscillations are developed in a well known manner. The high potential end of inductance L3 is coupled to the anodes of tubes 108 and 110, while the control grids 104 and 106 are coupled to opposite terminals of the resistance 114 in a phase shifting network quite fully described hereinbefore in connection with the tubes 80 and 82 and inductance L and resistance 92.

The frequency of the carrier energy generated in tube 112 is controlled by a third section of switch 100 cooperating with five condensers C3, the selected one of which is connected in shunt to the grid circuit of tube 112 including inductance L3 and resistor 114. Note that the sections of the switch 100 are ganged and that a different intensity of timing modulated oscillatory energy of intermediate frequency is supplied to the input electrodes 104 and 106 of tubes 108 and 110 for each particular frequency generated in the radio frequency generator. The object of this is to maintain the frequency swing the same at the various operating frequencies.

In this generator and modulator the voltage regulator tubes 111, 113 and 115 reduce voltage fluctuations and thereby stabilize the frequency of operation of the generator. Oscillator drift due to ageing in the modulator tubes is inherently compensated in the pushpull circuit. This is true also of the I. F. generator and tubes 80 and 82.

The tube 124 is a radio frequency buffer amplifier of the cathode follower type having its control grid coupled to the high radio frequency potential end of inductance L3 and its cathode resistance coupled to the control grid of tube 130. The tube 130 is the output amplifier tube and has its anode connected with the tank circuit including tuning condenser C5 and inductance L5.

The system may be used as the exciter of a transmitter, in which case inductance L5 is coupled by inductance L6 to transmitting apparatus. This exciter supplies sufficient voltage output from the low impedance tank circuit C5, L5, R5 to drive the buffer tube of the transmitter for which it is intended. In the present application the tank L5, C5 is arranged to tune through a 5 to 10 megacycle range and the coupling through L6 to the transmitter is arranged so that little or no reactance is reflected from the driven transmitter to the exciter. In some standard transmitters the tuned stages may need damping in order that they not attenuate the F. M. sidebands.

24, as stated above, is a conventional power source having filament heating windings and a rectifier arrangement which supplies potential to the tubes and relays shown.

Before proceeding with the description and operation of our transmitter, we will set forth briefly the nature of the receiver to be used therewith and the requirements of the transmitter as to wave form and modulation, etc., for operation of the receiver and relays in the manner desired.

In an embodiment of the receiver a novel detecting system as well as a novel relay setup is used.

In the detecting system double demodulation takes place and in the intermediate frequency demodulator the detector output doubles the tone frequency supplied by the unit 10. In other words, where the oscillator 10 is adapted to operate at a selected one of eight frequencies running from 200 to 1200 cycles, at the detector output one may select one of eight frequencies running from 400 to 2400 cycles. This detected output includes in addition to the selected tone frequency a direct current component which is derived from the received and rectified carrier. The selected tone frequency is used to step up one of a series of dialing sensitive digital relays, there being four in the embodiment described, but there may be more if a larger number of combinations are desired. Absence of the direct current component derived by demodulation of the carrier is used to transfer operation of the tone frequency from one dialing sensitive digital relay to the next.

The direct current component depends upon the carrier and since in the operation at the receiver it is desired to interrupt the direct current component to thereby operate a relay, we provide means at the transmitter for interrupting the carrier after each dialing operation. As stated above, the audio frequency is pulsed by the dialing system 70 at a repetition rate of about ten pulses per second, this permitting the transmission of 1 to 10 audio pulses per dial operation. At the completion of each dialed number the radio frequency is interrupted approximately for $\frac{1}{10}$ second, this interruption being used to operate the transfer switch mentioned above, which conditions a second digital ratchet relay for operation, assuming that the first one was operated by the dialing described above.

In order to interrupt the transmitted carrier to initiate this transfer function at the receiving terminal equipment, the relay 130 is so connected that it is energized for about $\frac{1}{10}$ of a second, after each dialing operation, by closure to the right of the dialing mechanism contacts 135. Closing these contacts puts the condenser 136, which has been charged during the dialing operation (contact 135 closed at left and remaining closed by an off-normal contact until the dial has returned to its normal quiescent position), in series with the winding 137 to energize the same to close a contact 139 which includes the condenser 140 across the radio frequency oscillation generator tank L3, C3. This condenser detunes the tank oscillator and the exciter for the transmitter to such an extent that as far as the receiver is concerned the signal is removed. Where this exciter unit is used with a transmitter, we contemplate use of this relay in a keyable circuit in the transmitter, since its function is to interrupt the transmission after each number dialed.

In operation, the power supply A. C. switch 170 should be turned on three minutes before operating the unit, to allow for frequency stabilization. If this switch is turned off, it must not be turned on until the heaters have cooled about one minute, to allow the initial power supply B voltage to reach a value that will ignite the gas regulator tubes.

The I. F. relay switch 180 should be set to the "Tune" position, that is, closed to the right hand contacts. This places the winding of relay 184 across the power supply and the relay is pulled down to connect the grids of reactance tubes 108 and 110 to ground, the input from stage 16 being thereby removed. The R. F. selector switch 100 is set to the desired frequency and the output amplifier tuning dial on condenser C5 is set to the point previously found as tuning to the corresponding frequency.

Remembering that the exciter output at L5 is one quarter of the frequency at the final output after multiplication in the transmitter, the transmitter is tuned in the usual manner to quadruple the exciter frequency. In an embodiment the exciter frequency is in a band from 5 to 8 megacycles and the transmitter output in a band of 20 to 32 megacycles. The transmitter is then switched to the "Standby" position and the I. F. relay switch 180 on the exciter unit is switched to "Operate," that is, closed to the left. This deenergizes the winding of relay 184, and the grids of the reactance tubes 108 and 110 are connected to the balanced resistance network BP to be excited by the tone modulated output of the stage 16. The equipment is now ready to operate. Moreover, since the digital relays and other relays in each of the various receivers are frequency sensitive and respond to one particular tone frequency only and the various receivers also select only a particular intermediate frequency, operation on any of the 400,000 combinations possible on one radio frequency can be carried out. There are five different carrier frequencies from which to select, thereby giving a total of 2,000,000 possible combinations.

When a certain receiver is to be dialed, the A. F. and I. F. tuning dials are set and the transmitter is switched from "Standby" to "Operate." The proper number is dialed and the transmitter is returned to "Standby." In order to allow other receiving equipment to "home," that is, permit their relays to return to their original settings, a period of five seconds should elapse before dialing another receiver having the same R. F. and I. F. When one receiver is used to operate two or more detonators on different dialed numbers, this homing sequence must be carefully observed.

We claim:

1. In a signalling system of the class described, a first source of potentials of tone frequency, a second source of wave energy of carrier wave frequency the frequency of which may be adjusted by steps through a range of frequencies, a modulator associated with said second source for modulating the said wave energy of carrier wave frequency, an attenuating network comprising adjustable voltage attenuating impedances coupled to said first source and to said modulator, a dialing circuit in one of said couplings for pulsing the tone applied to said modulator through a range of pulses and common control means for adjusting the impedance of said attenuating network and the frequency of said second source to insure modulation of the selected carrier through a predetermined range by the tone frequency potentials.

2. In a signalling system of the class described, a first source of potentials of tone frequency, a second source of wave energy of carrier wave frequency the frequency of which may be adjusted by steps through a range of frequencies, a modulator associated with said second source for modulating the timing of said wave energy of carrier wave frequency, an attenuating network comprising adjustable voltage attenuating impedances coupled to said first source and to said modulator, a dialing circuit in one of said couplings for pulsing the tone applied to said modulator through a range of pulses and common control means for adjusting the impedance of said attenuating network and the frequency of said second source to insure timing modulation of the selected carrier through a predetermined range by the tone frequency potentials.

3. In a signalling system of the class described, a source of control potentials, a first source of wave energy of carrier wave frequency the frequency of which may be adjusted by steps through a range of frequencies, a modulator associated with said first source of wave energy for modulating the said wave energy of carrier wave frequency, an attenuating network comprising adjustable voltage attenuating impedances coupling said source of control potentials to said modulator, common control means for adjusting the impedance of said attenuating network and the frequency of said first source to insure modulation of the selected carrier through a predetermined range by the control potentials, a second source of oscillations of carrier wave frequency, and a modulator connected to said first carrier source and to said second carrier source for modulating the oscillations of said second source of oscillations of carrier wave frequency in accordance with modulated carrier energy from said first wave energy source.

4. In a signalling system of the class described, a source of control potentials, a first source of wave energy of carrier wave frequency the frequency of which may be adjusted by steps through a range of frequencies, a reactance tube modulator associated with said first source of carrier wave energy for timing modulating the said wave energy of carrier wave frequency, an attenuating network comprising adjustable voltage attenuating impedances coupling said source of control potentials to said modulator, common control means for adjusting the impedance of said attenuating network and the frequency of said first source of carrier wave frequency to insure timing modulation of the selected carrier through a predetermined range by the control potentials, a second source of oscillations of carrier wave frequency, and a reactance tube modulator coupled to said first and second sources of carrier wave frequency for modulating the timing of the oscillations of said second source of oscillations of carrier wave frequency in accordance with the first mentioned timing modulated wave energy.

5. In a signalling system of the class described, a first source of oscillations of tone frequency, a second source of wave energy of carrier wave frequency, a modulator associated with said second source and said first source for modulating the said wave energy of carrier wave frequency in accordance with said tone frequency, a dialing circuit having an input coupled to said first source and an output coupled to said modulator for pulsing the tone supplied to said modulator through a range of pulses, transmitting means coupled to said second source, and means for suppressing transmission following each operation of said dialing circuit.

6. In a signalling system of the class described, a first source of oscillations of tone frequency, a second source of wave energy of carrier wave frequency, a modulator associated with said second source and said first source for modulating the timing of said wave energy of carrier wave frequency in accordance with said tone frequency, a dialing circuit having an input coupled to said first source and an output coupled to said modulator for pulsing the tone supplied to said modulator through a range of pulses, a third source of wave energy of carrier wave frequency, connections from said second source to said third source for modulating the timing of the oscillations of said third source in accordance with the timing modulated oscillations from said second source, transmitting means coupled to said third source of wave energy of carrier wave frequency, and means for suppressing transmission therefrom following each operation of said dialing circuit.

7. In a signalling system of the class described, a first source of wave energy the frequency of which may be altered by steps through a range of frequencies, a second source of wave energy of carrier wave frequency the frequency of which may be adjusted, connections for modulating a selected carrier frequency from said second source through a predetermined range by wave energy of a selected frequency from said first source, transmitting means coupled to said second source, means in said first named connections for breaking up the wave energy of selected frequency, used to modulate said second source, to form a selected number of pulses, and means for suppressing transmission from said second source intermittently between pulses or groups of pulses.

8. In a signalling system of the class described, a first source of oscillations of tone frequency the frequency of which may be altered by steps through a range of frequencies, a second source of wave energy of carrier wave frequency the frequency of which may be adjusted, connections for modulating a selected carrier frequency from said second source through a predetermined range by a selected tone from said first source, means in said first named connections for breaking up the selected tone, used to modulate said second source, to form a selected number of pulses, a third source of oscillations of carrier wave frequency, means for modulating said last named source in accordance with the modulated output of said second source, transmitting means coupled to said last named source, and means for suppressing transmission therefrom between pulses or groups of pulses.

9. In a signalling system of the class described, a first source of oscillations the frequency of which may be altered by steps through a range of frequencies, an amplifier having an input and an output, a second source of wave energy of carrier wave frequency the frequency of which may be adjusted by steps through a range of frequencies, an attenuating network comprising adjustable voltage attenuating impedances, coupling said first source to said amplifier input, a modulator associated with said second source for modulating the said wave energy of carrier wave frequency, a dialing circuit coupling said amplifier output to said modulator and common control means for adjusting the impedance of said attenuating network and the frequency of said second source to insure modulation of the selected carrier through a predetermined range by the first oscillations.

10. In a signalling system, a source of wave energy of tone frequency, a source of wave energy of intermediate frequency, a source of wave energy of carrier frequency, means for modulating the timing of the wave energy of intermediate frequency in accordance with the energy of tone frequency, means for modulating the timing of the energy of carrier wave frequency in accordance with the timing modulated intermediate frequency energy, means for changing the frequency of said second and third mentioned sources by predetermined amounts, means for changing the amplitude of the tone energy when the frequency of the second mentioned source is changed, and means for changing the amplitude of the timing modulated intermediate frequency energy when the frequency of the third mentioned source is changed.

11. In a signalling system, a source of oscillatory energy of tone frequency the frequency of which may be changed by steps through a range of frequencies, a source of oscillatory energy of intermediate frequency and a pair of modulator tubes associated therewith, a controllable pulsing system coupling said source of oscillatory energy of tone frequency to the pair of modulator tubes, means for selectively changing the frequency of the intermediate frequency oscillations by steps through a range, a carrier wave generator the frequency of operation of which may be changed by steps in a range of frequencies, a second pair of reactance tube modulators associated with said carrier wave generator, and a coupling between said intermediate frequency oscillatory source and said last mentioned pair of reactance tubes.

12. In a signalling system, a source of oscillatory energy of relatively low frequency, the frequency of which may be changed through a range of frequencies, a source of oscillatory energy of intermediate frequency, a modulator tube coupled to said last named source, a controllable pulsing system coupling said source of oscillatory energy of relatively low frequency to said modulator tube, apparatus for selectively changing the frequency of the intermediate frequency oscillations through a range of frequencies, a wave generator of carrier wave frequency, the frequency of operation of which may be changed through a range of frequencies, a second modulator tube coupled to said last named generator of carrier wave frequency, and apparatus coupling said source of intermediate frequency to said last named modulator tube for modulating the oscillations of carrier wave frequency in accordance with the modulated oscillations of intermediate frequency.

JOHN A. RANKIN.
WILLIAM R. ALEXANDER.
HARMON B. DEAL.

REFERENCES CITED

The following references are of record in the file of this patent:

UNITED STATES PATENTS

| Number | Name | Date |
|---|---|---|
| 2,036,165 | Usselman | Mar. 31, 1936 |
| 2,131,558 | Granger | Sept. 27, 1938 |
| 2,162,335 | Jacob | June 13, 1939 |
| 2,233,183 | Roder | Feb. 25, 1941 |
| 2,274,648 | Bach | Mar. 3, 1942 |
| 2,309,678 | Smith | Feb. 2, 1943 |
| 2,339,608 | Alvira | Jan. 18, 1944 |
| 2,355,338 | Stewart | Aug. 8, 1944 |